United States Patent [19]
Andersson

[11] 3,747,180
[45] July 24, 1973

[54] ADJUSTABLE TOOL HOLDER
[76] Inventor: Karl Ivan Andersson, Noltorpsvagen 3D, Mariestad, Sweden
[22] Filed: Feb. 23, 1972
[21] Appl. No.: 228,591

[52] U.S. Cl. ............................ 29/97.5 R, 82/36 R
[51] Int. Cl. ......................... B26d 1/00, B23b 29/00
[58] Field of Search .................. 29/97.5 R; 82/36 R

[56] References Cited
UNITED STATES PATENTS

| | | | |
|---|---|---|---|
| 3,557,646 | 1/1971 | Agnew | 29/97.5 R |
| 3,543,618 | 12/1970 | Holden | 82/36 R |
| 3,232,153 | 2/1966 | Davis | 29/97.5 R |
| 2,962,800 | 12/1960 | Swenson | 29/97.5 R X |
| 2,928,906 | 3/1960 | Gernert | 29/97.5 R X |
| 2,916,802 | 12/1959 | Blandstand | 29/97.5 R |
| 2,597,619 | 5/1952 | Clark | 29/97.5 R X |
| 2,527,871 | 10/1950 | Bakewell | 29/97.5 R X |

Primary Examiner—Harrison L. Hinson
Attorney—George Vande Sande

[57] ABSTRACT

An adjustable tool holder, for use in a machine tool, such as a lathe, for holding a tool, such as a cutter, by means of which a workpiece is to be machined, comprises a body fixable on the machine tool and a bridge, adapted for the tool, such as the cutter to be secured thereto, said bridge (a) locating, at one end on one or more spherical elements which engage in the body and provide a swivel axis for the bridge, and (b) being connected at the other end to the body by an adjusting screw rotation of which adjusts the proximity of the bridge relative to the body by swinging it about the swivel axis, and therefore provides fine adjustment of the tool.

16 Claims, 12 Drawing Figures

ADJUSTABLE TOOL HOLDER

This invention relates to an adjustable tool holder for use in a machine tool, such as a lathe, for holding a tool, such as a cutter tool, by means of which a workpiece is to be machined.

In this field, improvements in precision are continually striven for, since certain workpieces can never be machined sufficiently precisely. At the same time, efforts are being made to improve rapid adjustment and control of the exact position of the tool in relation to the workpiece. Such position adjustments have to be effected comparatively frequently, not only before starting work, but also during the work, since inevitable temperature variations always cause changes of the relative positions of the tool and the workpiece.

Solutions hitherto proposed on the basis of the above-mentioned aspirations can be considered only as compromise solutions as none of them satisfy simultaneously both the need for machining precision and the need for rapidity of adjustment. An object of the present invention is to provide an adjustable tool holder which simultaneously fulfils both these needs.

With this object in view, the present invention provides a tool holder, for a tool such as a cutting tool for a lathe comprising a fixable body having means for securing a tool thereto with coarse adjustment, characterised in that the said means for securing is provided on a bridge which butts by one end against said body by way of at least one spherical element which provides a swivel axis for limited swinging of said bridge, the other end of said bridge being swingable, by means of an adjusting screw engaged in said body, in finely adjustable manner relative to said body.

The invention will be described further, by way of example, with reference to the accompanying drawings, in which.

Figure 1:
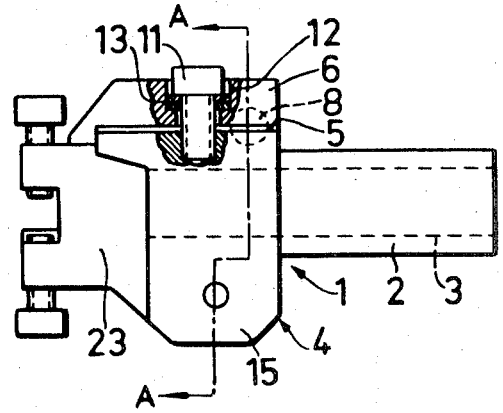
FIG. 1 is a part-sectional side elevation of a first embodiment of the holder of the invention.
Figure 2:
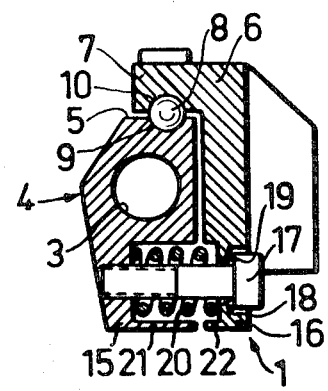
FIG. 2 is a section taken along the line A—A of FIG. 1.
Figure 3:
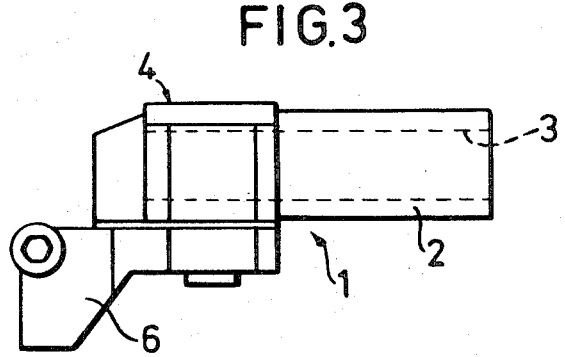
FIG. 3 shows the same holder as viewed from below in FIG. 1.
Figure 4:
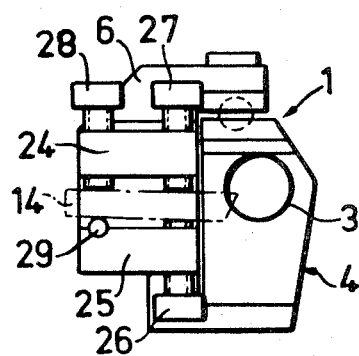
FIG. 4 shows the same holder as viewed from the left in FIG. 1.

The tool holder shown in FIGS. 1 to 5 will firstly be described. This holder is designated as a whole by the reference numeral 1 and is suitable for mounting on an automatic turning lathe so as to be rotatable. Mirror-inverted, the holder can be used in a turret turning lathe. This does not, of course, preclude the possibility that the tool holder can be used in other environments, i.e. in other machine tools.

The holder 1 has a hollow cylindrical shank 2 for clamping, for example, in the turret head of a machine tool. Axial central bore 3 of the shank 2 is open at the free end thereof and also extends through a body 4 connected to the other end of the shank 2. This body 4 extends in an axial plane, as can be seen from FIG. 1, somewhat outside the periphery of the shank 2 to provide an axially-extending locating surface 5, at a right angle to the said plane, for the mounting of a bridge 6 which locates by an angle bracket 7 thereof, at a slight spacing, on this surface 5. This spacing is provided by two spherical elements 8 which are located in sockets 9 and 10, disposed opposite one another respectively in the locating surface 5 and the angle bracket 7. Respective channels, not shown, may extend freely outwards from the bottoms of the sockets 8, 9.

Disposed preferably between the two spherical elements 8 and extending through the angle bracket 7 is a clamping bolt 11 which extends through the locating surface 5 and is anchored in the body 4. This bolt 11 is surrounded, with substantial clearance in the angle bracket 7, by a countersunk bore 12. Arranged between the head of the bolt 11 and the shoulder provided by the countersunk bore 12 is at least one disc spring or the like 13 which presses the angle bracket 7 of the bridge 6 securely against the spherical elements 8 and, consequently, against the body 4. Thanks to this disc spring, and the clearance between the clamping bolt 11 and to the shoulder in the bore 12, as well as to the design and the co-operative relationship between the bridge 6 and the body 4 by way of the spherical elements 8, limited swinging movement of the bridge 6 relative to the fixed body 4 about an axis extending through the centres of the spherical elements 8 is possible. The bridge 6 serves for the reception and holding of a cutting or like tool as indicated in dot-dash lines at 14 in FIG. 4.

Figure 5:
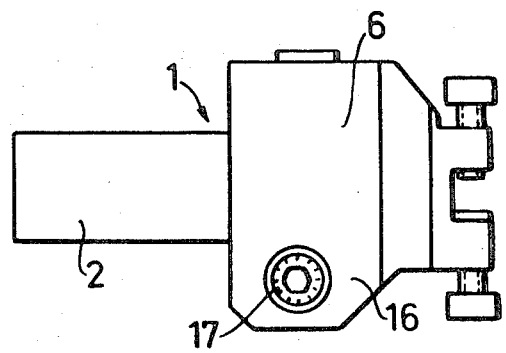
FIG. 5 shows the same holder as viewed from the left in FIG. 4.

The body 4 extends, in the said axial plane, transversely away from the locating surface 5, in order to form, alongside a corresponding portion 16 of the bridge 6, a projection 15 which projects beyond the periphery of the shank 3 and which serves for connection thereto of the bridge portion 16 and for securing the latter so as to be at an extremely finely adjustable spacing therefrom. For this purpose, an adjusting crew 17 extends through the bridge part 16 and is anchored in the projection 15. The head of the adjusting screw 17 abuts against a disc 19 which rests by a spherical surface thereof against a correspondingly formed shoulder in a countersunk bore 18 in the bridge portion 16. The central section of the shank of the adjusting screw 17 is surrounded by a comparatively powerful spring 20, which is accommodated in recesses 21 and 22 in the parts 15 and 16, and which presses these parts apart, so that the bridge portion 16 butts securely against the disc 19 and, consequently, against the head of the adjusting screw 17 which head is preferably graduated as shown in FIG. 5.

The bridge 6 extends axially forwards with a central part 23 which is cantilevered at its free end. The part 23 is shaped to provide two transverse clamping jaws 24, 25 in which clamping bolts 26, 27 and 28 and a cylindrical peg 29 are fitted for the purpose of receiving and securing the tool 14, these bolts 26, 27, 28 providing for coarse adjustment of the tool 14 in a transverse plane.

The above-described holder is extremely easy to instal, as well as to adjust coarsely and finely. After clamping the holder in a machine tool and the mounting of the workpiece to be machined, the tool 14 is initially coarsely adjusted by means of the bolts 26, 27, 28 as will readily be understood from the drawings. Then the adjusting screw 17 is rotated until the desired exact positioning of the tool 14, for example relative to the workpiece's centre, is achieved. Adjustments with an accuracy of 0.005 mm are possible, whilst the arrangement may provide for total fine adjustment to the amount of 2 mm. The holder is compact, stable and robust, and allows both increase and decrease of the spacing of the tool from the workpiece's centre without the slightest play or back-lash. The fine adjustment takes place both extremely accurately and rapidly, and to achieve this only one adjusting screw has to be actuated. Forces arising during machining are absorbed, in the example shown, by the outer spherical element 8. Because the adjusting screw 17 is positioned far away from the swivel axis formed by the spherical elements 8 and also from the tool 14, extremely fine precision is achieved.

Figure 6:
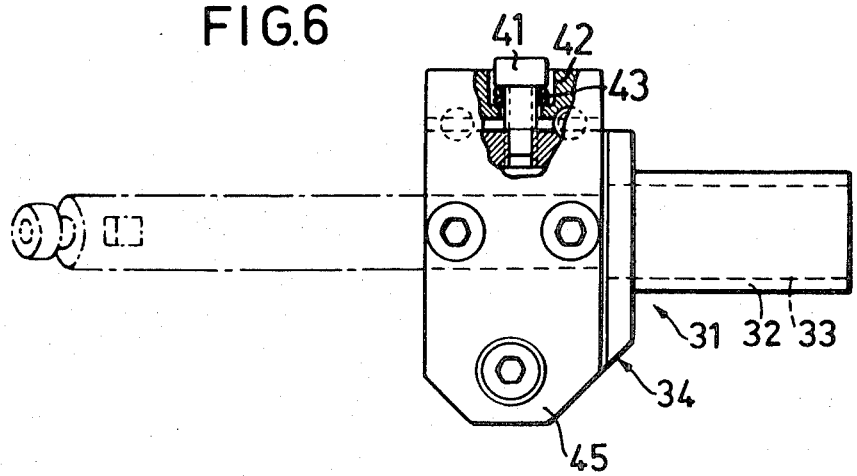
FIG. 6 is a part-sectional side elevation of a second embodiment of the tool holder of the invention.
Figure 7:
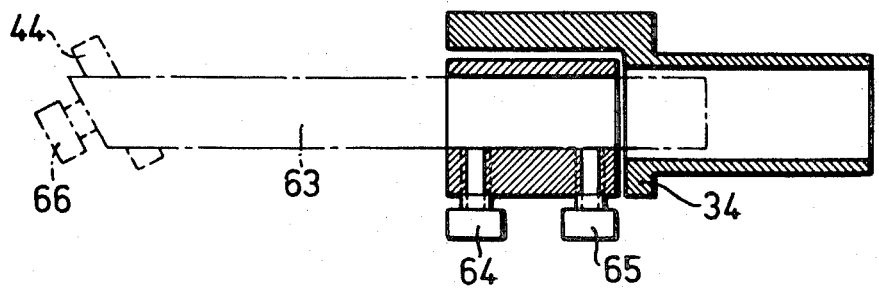
FIG. 7 is a part-sectional plan view of the holder shown in FIG. 6.
Figure 8:
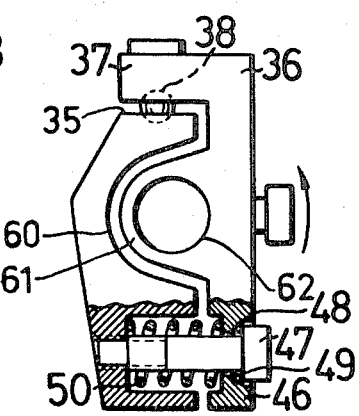
FIG. 8 is a part-sectional end elevation of the same holder as viewed from the left in FIG. 6, one of the components having been omitted.
Figure 9:
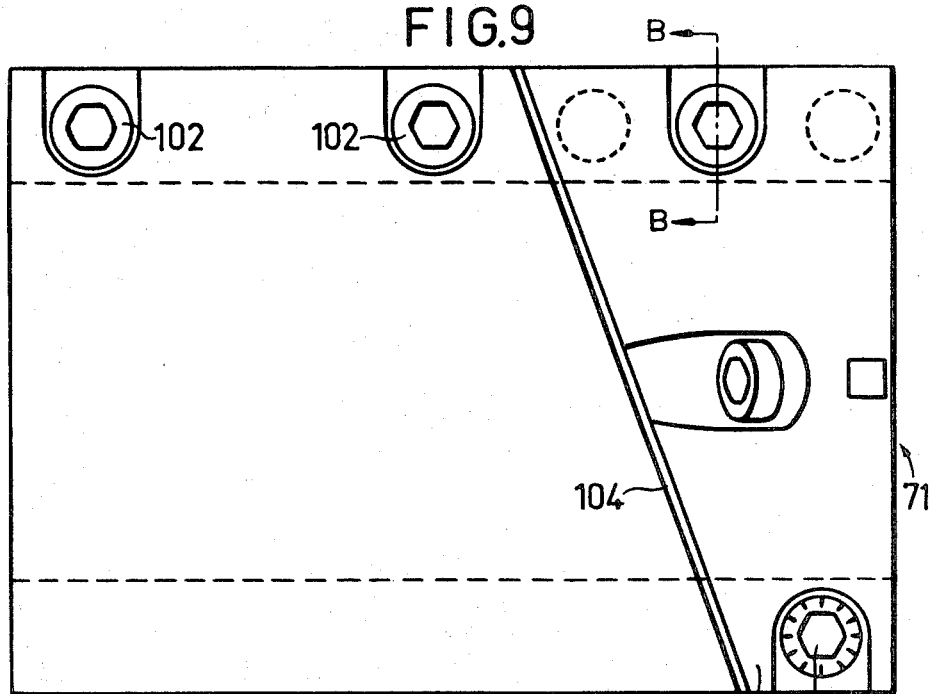
FIG. 9 is a side view of a third embodiment of the holder of the invention.
Figure 10:
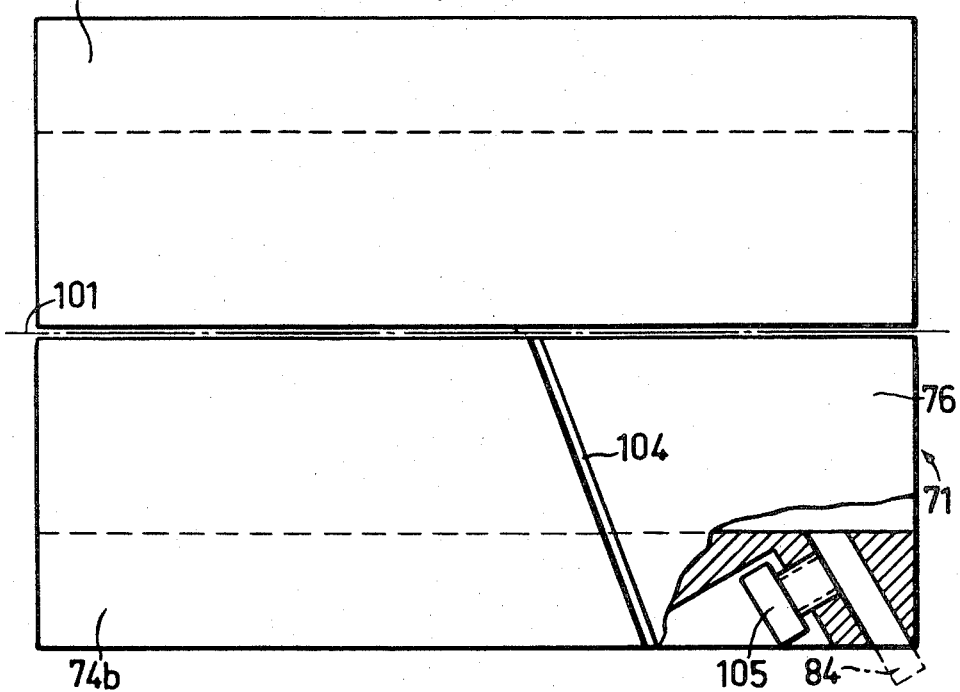
FIG. 10 is a part-sectional plan view of the holder shown in FIG. 9.
Figure 11:
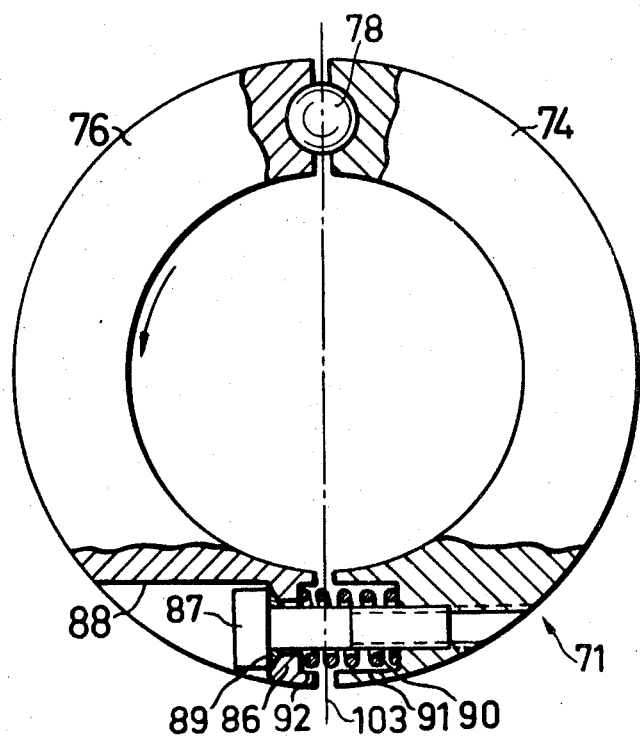
FIG. 11 is a part-sectional end view of the same holder as viewed from the right in FIG. 9.
Figure 12:
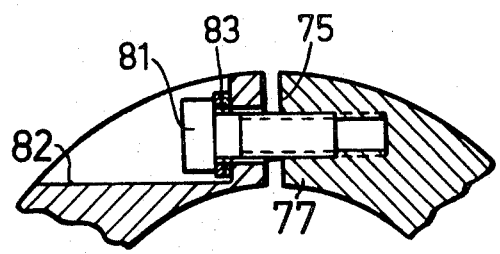
FIG. 12 is a section taken on the line B-B of FIG. 9.

The second embodiment of the tool holder of the invention shown in FIGS. 6, 7 and 8 is indicated by the reference numeral 31 and is adapted for use both for internal and external turning. It is constructed, in principle, similarly to the tool holder of FIGS. 1 to 5, and comprises a shank 32 and a body 34 having a central bore 33, the body 34 having a locating surface 35 and projection 45. All the parts of this embodiment which correspond to similar parts of the embodiment of FIGS. 1 to 5 are designated by corresponding reference numerals increased by 30.

The primary difference from the embodiment of FIGS. 1 to 5 consists in that the body 34 is provided with an axial recess 60 which is substantially concentric to the axis of the shank 32. The bridge protrudes into this recess 60 with a corresponding, but smaller, projection 61 having a coaxial contiguous bore 62 which preferably has a somewhat lesser diameter than the bore 33 of the shank 32. Introduced into the bore 62 is a rod 63 which is locked by screws 64 and 65 and whose outer end carries a tool 44 fixed by means of a screw 66. Otherwise, this embodiment corresponds to the one described with reference to FIGS. 1 to 5.

Illustrated in FIGS. 9 to 12 is an adjustable tool holder 71 which is intended chiefly for use in relation to boring. The entire holder has the overall shape of a substantially hollow cylinder, and comprises a body split by at least one radially and axially extending cut 101 into sides 74a, 74b, which are adapted to be pressed together by bolts 102 for the purposes of frictional locking onto a rod (not shown) that is to be clamped. Of course, the cut can be effected diametrically, so that the body is in two halves which can be connected together in the manner described.

Separated from the body, by the said radially and axially extending cut 101 as well as by a diametrical continuation 103 of the same and a cut 104 extending, preferably obliquely, peripherally of the body, is a bridge 76 whose longer axial edge butts against the corresponding edge 75 of the body by way of spherical elements 78 between which is a clamping bolt 81 fitted with disc springs or the like 83. The shorter axial edge 86 of the bridge 76 is connected adjustably to the body by an adjusting screw 87 fitted with a spherical disc 89 and a pressure spring 90 accommodated in recesses 91 and 92.

The central part of the bridge 76 is formed with an oblique slot for accommodating a tool 84 which is directed obliquely forwards and outwards of the holder and is secured by means of a screw 105.

The function and mode of operation of this embodiment is the same as that of the two previously-described embodiments.

Of course, modifications can be made to the described embodiments within the scope of the invention as defined by the following claims. Thus, for example, the bridge 7 (FIG. 2) can extend partially around the body and can butt by way of spherical elements, in the described manner, against the body. In this case, a further pressure spring can be inserted between the two end regions of the bridge, and the clamping bolt 11 can, possibly, be omitted.

Also, the clamping bolts may be replaced by a clamping element which is substantially C-shaped in profile, a C-shaped stirrup or yoke, or the like. Such an element can engage, at a bracing, around the spherical elements so that the ends of the C's lie in the same plane as one of the common planes of symmetry of the spherical elements which plane extends, like the back of the C, approximately parallel to the bridge. The two ends of the C's can also be anchored in the body in such a way that the spherical elements lie completely in the C whose longitudinal plane of symmetry is arranged parallel to the bridge.

I claim:

1. An adjustable tool holder, for a tool such as a cutting tool for a lathe comprising a fixable body having means for securing a tool thereto with coarse adjustment, characterised in that the said means for securing is provided on a bridge which butts by one end against said body by way of at least one spherical element which provides a swivel axis for limited swinging of said bridge, the other end of said bridge being swingable, by means of an adjusting screw engaged in said body, in finely adjustable manner relative to said body.

2. A tool holder as set forth in claim 1, characterised in that said swivel axis of said bridge is provided by at least two of said spherical elements between which is at least one clamping bolt which is engaged rotatably in said body and is surrounded, with clearance, by a bore in said bridge.

3. A tool holder as set forth in claim 2, characterised in that said clamping bolt bore is formed with a shoulder, and at least one disc spring is disposed between said shoulder and the head of said clamping bolt.

4. A tool holder as set forth in claim 1, characterised in that said adjusting screw is surrounded by a pressure spring which permanently presses apart the respective ends of said body and said bridge.

5. A tool holder as set forth in claim 4, characterised in that said adjusting screw is surrounded, with clearance, by a countersunk bore which is arranged in said bridge and has a shoulder of concave form, and in that a corresponding planoconvex disc butts against said shoulder and against the head of said adjusting screw, to permit limited swivel movement of said bridge relative to said adjusting screw.

6. A tool holder as set forth in claim 1, characterised in that said adjusting screw is provided with a graduated scale.

7. A tool holder as set forth in claim 1, characterised in that said body is hollow in design and is provided with a hollow shank, in that said body projects beyond said shank on two opposed sides of an axial plane, and in that said bridge conforms with the contour of said body in the region of said adjusting screw, whilst said bridge projects, in the region of said axis, parallel to said axial plane beyond said body, in order to butt, by its projecting part, against said body, by way of said spherical element, by means of an angle bracket.

8. A tool holder as set forth in claim 7, characterised in that a central part of said bridge is extended forwards to provide clamping jaws for the locking and coarse adjusting of said tool by means of clamping bolts.

9. A tool holder as set forth in claim 7, characterised in that said body is provided with an axial recess which extends substantially concentrically to the axis of said shank, and in that said bridge engages into this recess by a corresponding, but smaller-dimensioned, projection having a bore which is coaxial with the shank and of reduced diameter, for the reception of a rod which supports said tool and which can be fixed by means of clamping bolts.

10. A tool holder as set forth in claim 1, characterised in that said holder has an overall shape approximating to a hollow cylinder which is divided by cuts to define said body, which is adapted to be secured onto a rod, said bridge, which is mounted in a limitedly swingable manner on said body and which is separated from said body by axial ones of said cuts, and a cut which extends in the peripheral direction of said cylinder.

11. A tool holder as set forth in claim 10, characterised in that said cut which extends in the peripheral direction extends obliquely in order to provide, on said bridge, a longer axial edge and a shorter axial edge.

12. A tool holder as set forth in claim 11, characterised in that said longer axial edge has therethrough a clamping bolt which extends tangentially through said edge and is engaged rotatably in a confronting edge of said body whilst said shorter axial edge of said bridge, and the respective confronting edge of said body receive a similarly arranged adjusting screw.

13. A tool holder as set forth in claim 12, characterised in that a central section of said bridge supports said tool which is directed obliquely forwards and outwards and is locked, so as to be coarsely adjustable, by means of a clamping bolt.

14. A tool holder as set forth in claim 10, characterised in that said body is divided by at least one axial cut, and in that the body sides formed in this way are held together by tangentially arranged screws which clamp the body on a rod.

15. A tool holder as set forth in claim 1, characterised in that said bridge and said body are held together by a clamping member which is C-shaped in profile and which engages, at a spacing therefrom, around said spherical elements so that the ends of said C lie in one of the common planes of symmetry of said spherical elements which plane extends, like the back of said C, approximately parallel to said bridge.

16. A tool holder as set forth in claim 1, characterised in that said bridge and said body are held together by a clamping member which is C-shaped in profile and which embraces, at a spacing therefrom, the spherical elements which lie completely in the C whose longitudinally-extending plane of symmetry is arranged parallel to said bridge and whose two ends are anchored to said body.

* * * * *

PO-1050
(5/69)

UNITED STATES PATENT OFFICE
CERTIFICATE OF CORRECTION

Patent No. 3,747,180                Dated July 24, 1973

Inventor(s) KARL IVAN ANDERSSON

It is certified that error appears in the above-identified patent and that said Letters Patent are hereby corrected as shown below:

Foreign Application Priority Data

March 5, 1971   Sweden. . . . . . . . . . . . . . . . .2892/71

Signed ;and sealed this 25th day of December 1973.

(SEAL)
Attest:

EDWARD M. FLETCHER, JR.           RENE D. TEGTMEYER
Attesting Officer                  Acting Commissioner of Patents